(12) United States Patent
Knezevik et al.

(10) Patent No.: US 11,993,470 B2
(45) Date of Patent: May 28, 2024

(54) MODULAR SYSTEMS AND METHODS FOR DIRECT VACUUM DISPENSING AND LOSS IN WEIGHT MEASURING OF DRY FLOWABLE MATERIALS

(71) Applicant: Halliburton Energy Services, Inc., Houston, TX (US)

(72) Inventors: Nebojsa Knezevik, Broomfield, CO (US); Elizabeth Loraine Wells, Murphy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 482 days.

(21) Appl. No.: 17/024,242

(22) Filed: Sep. 17, 2020

(65) Prior Publication Data
US 2022/0081231 A1    Mar. 17, 2022

(51) Int. Cl.
  *B65G 69/18*   (2006.01)
  *B65D 88/32*   (2006.01)
  *E21B 21/06*   (2006.01)

(52) U.S. Cl.
  CPC ........... *B65G 69/182* (2013.01); *B65D 88/32* (2013.01); *E21B 21/062* (2013.01)

(58) Field of Classification Search
  CPC ...... B65D 88/32; E21B 21/062; B65G 69/182
  See application file for complete search history.

(56) References Cited

U.S. PATENT DOCUMENTS

| | | | | |
|---|---|---|---|---|
| 3,854,612 | A * | 12/1974 | Snape | B65D 88/66 222/196 |
| 4,273,266 | A * | 6/1981 | Snape | B65G 65/44 222/203 |
| 5,653,354 | A * | 8/1997 | Olson | B65D 77/061 220/495.1 |
| 5,775,852 | A * | 7/1998 | Boutte | B65B 69/0091 406/120 |
| 6,253,966 | B1 * | 7/2001 | Dinkel | B65D 88/72 222/481.5 |
| 10,358,248 | B2 | 7/2019 | Donohoo et al. | |
| 2007/0255450 | A1 | 11/2007 | Mazur et al. | |
| 2014/0326751 | A1 * | 11/2014 | Snape | B65D 61/00 222/196 |

(Continued)

*Primary Examiner* — Timothy P. Kelly
(74) *Attorney, Agent, or Firm* — John Wustenberg; Parker Justiss, P.C.

(57) ABSTRACT

Systems and methods for dispensing dry flowable materials used in wellbore operations. In some embodiments, the methods include: providing at least one vessel that contains dry flowable materials, each vessel including an outlet connected to a common vacuum manifold; providing a vacuum source for directing a flow of the dry flowable materials from at least one vessel to the common vacuum manifold; discharging the dry flowable materials from the vessel to the common vacuum manifold through an outlet connected to at least one vessel, wherein a discharge valve is disposed on the outlet; determining an amount of dry flowable materials in at least one vessel at least in part using at least one load cell disposed underneath the vessel; and determining the amount of dry flowable materials being routed to the common vacuum manifold based at least in part on the amount of dry flowable materials measured in the vessel.

19 Claims, 4 Drawing Sheets

(56) References Cited

U.S. PATENT DOCUMENTS

| | | | |
|---|---|---|---|
| 2015/0034669 A1* | 2/2015 | Hamilton | B65D 88/26 |
| | | | 222/196 |
| 2017/0355534 A1 | 12/2017 | Hunt | |
| 2018/0028992 A1* | 2/2018 | Stegemoeller | B01F 25/103 |
| 2018/0201437 A1* | 7/2018 | Surjaatmadja | B65D 90/54 |
| 2020/0048985 A1* | 2/2020 | Oehler | B65G 27/16 |
| 2020/0147566 A1 | 5/2020 | Stegemoeller et al. | |

* cited by examiner

MODULAR SYSTEMS AND METHODS FOR DIRECT VACUUM DISPENSING AND LOSS IN WEIGHT MEASURING OF DRY FLOWABLE MATERIALS

BACKGROUND

The present disclosure relates generally to systems and methods for use in dispensing operations, and more specifically, to improved systems and methods for dispensing dry flowable materials used in wellbore operations.

During the drilling and completion of oil and gas wells, various wellbore treating fluids are used for a number of purposes. For example, high viscosity gels are used to create fractures in oil and gas bearing formations to increase production. High viscosity gels are also used to maintain positive hydrostatic pressure in the well while limiting flow of well fluids into earth formations during installation of completion equipment. The high viscosity fluids are normally produced by mixing dry flowable materials (e.g., sand, proppant, gel, diverters, powders, granules, etc.) and agents with water at the well site as they are needed for the particular treatment. Systems for metering and mixing the various materials are normally portable (e.g., skid- or truck-mounted) since they are needed for only short periods of time at a well site.

The dry flowable materials are normally transported to a well site in a commercial or common carrier tank truck. Once the tank truck and mixing system are at the well site, the dry flowable materials must be transferred or conveyed from the tank truck into a supply tank for metering into a blender as needed. Well sites typically include one or more silos or supply tanks that are filled pneumatically on location and then connected to the blender through a series of belts or auger conveyors. The silos or supply tanks provide a large capacity of dry flowable materials to be supplied to the blender. Discharge gates on the silos or supply tanks output dry flowable materials to the conveyors, which then transfer the dry flowable materials to the blender.

Recent developments in dry material handling operations involve the use of portable containers for transporting dry flowable materials at a well site. The containers can be brought in on trucks, unloaded, stored on location, and manipulated about the well site when the material is needed. The containers are generally easier to manipulate on location than a large supply tank trailer. The containers are eventually emptied by dumping the contents thereof onto a mechanical conveying system (e.g., conveyor belt, auger, bucket lift, etc.). The mechanical conveying system then moves the dry flowable materials in a metered fashion to a desired destination.

BRIEF DESCRIPTION OF THE DRAWINGS

These drawings illustrate certain aspects of some of the embodiments of the present disclosure and should not be used to limit or define the claims.

Figure 1:
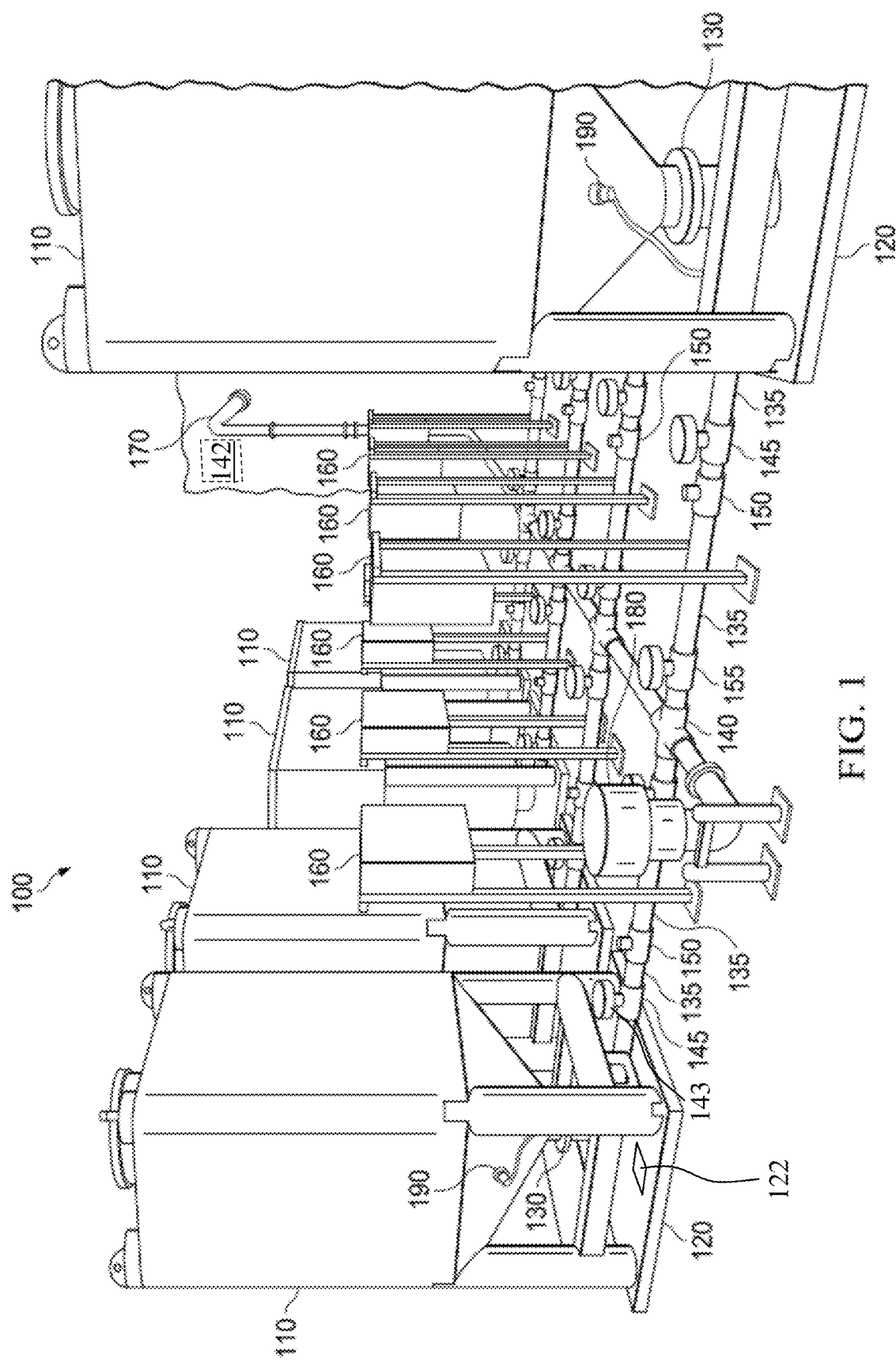
FIG. 1 is a perspective schematic view of vacuum dispensing systems in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will be recognizable to those skilled in the pertinent art and having the benefit of this disclosure. The depicted and described embodiments of this disclosure are examples only and not exhaustive of the scope of the disclosure.

DESCRIPTION OF CERTAIN EMBODIMENTS

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system-related and business-related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

The present disclosure relates generally to systems and methods for dispensing dry flowable materials used in wellbore operations. More particularly, the present disclosure relates to systems and methods for dispensing dry flowable materials based on loss in weight using direct vacuum dispensing.

The present disclosure provides vacuum dispensing systems for dispensing a certain amount of dry flowable materials. The vacuum dispensing systems may include a vessel for holding the dry flowable materials. The vessel may include an outlet connected to a common vacuum manifold. The dry flowable materials may be directed from the vessel to the common vacuum manifold. The vacuum dispensing systems may include one or more load cells that measure a weight of the dry flowable materials contained within the vessel. The vacuum dispensing systems may include a controller programmed to determine an amount of dry flowable materials contained within the vessel and being routed to the common vacuum manifold based at least in part on information from the one or more load cells. In some embodiments, the vacuum dispensing systems also may include a surge bin connected at a discharge end of the common vacuum manifold. In some embodiments, the common vacuum manifold may be configured to maintain a vacuum pressure of from about 6 inches Hg to about 21 inches Hg. The methods of the present disclosure generally include: providing at least one vessel that contains dry flowable materials; providing a vacuum source for directing a flow of the dry flowable materials from the vessel to a common vacuum manifold; determining an amount of dry flowable materials in the vessel at least in part using one or more load cells disposed underneath the vessel; and determining the amount of dry flowable materials being routed to the common vacuum manifold based at least in part on the amount of dry flowable materials measured in the vessel.

Among the many potential advantages to the systems and methods of the present disclosure, only some of which are alluded to herein, the systems and methods of the present disclosure may provide improved dispensing of dry flowable materials, inter alia, because the vacuum dispensing systems disclosed herein may increase the efficiency of dispensing dry flowable materials, particularly as compared to certain other dispensing systems known in the art. In certain existing systems, relatively small volume (e.g., around 50 pound ("lbs")) bags of dry flowable materials may be cut and manually lifted over a hopper leading to a surge bin and/or a screw feeder leading to a blender mixing compartment. The dry flowable materials fall via gravity from the bag into a hopper and/or are metered via a screw feeder to a blender mixer. In other existing systems, larger volume (e.g., around 2,000-3,000 lbs) "super sack" bags of dry flowable materials may be lifted by a crane or other overhead lifting means and cut to dump the contents into a hopper of a transferring device, then metered to a mixer. These existing methods of cutting, lifting, and dumping from bags may have to be repeated several times throughout the operation to provide the desired amount of materials, which may be complicated and time-consuming for an operator tending to the process. In contrast, in certain embodiments, the systems and methods of the present disclosure may be automated in order to reduce the human involvement in dispensing dry flowable materials. For example, in some embodiments, the vacuum dispensing systems of the present disclosure may be automated, which may allow the vacuum dispensing systems to more precisely measure the weight of dry flowable materials being dispensed based on the amount of dry flowable materials being routed to a common vacuum manifold. As such, the automation of dispensing dry flowable materials may allow for accurate and continuous dispensing while also reducing the amount of equipment (e.g., intermediary containers) and/or human contact that are typically required when dispensing dry flowable materials. Moreover, the systems and methods of the present disclosure may, in turn, reduce the amount of time and operational costs required to dispense the dry flowable materials. Accordingly, the systems and methods of the present disclosure provide vacuum dispensing systems that may simplify the dispensing of dry flowable materials, improve the process efficiency, and reduce the potential of human error.

In certain embodiments, the systems and methods of the present disclosure may be utilized to provide dry flowable materials for use in a variety of treatment processes used in wellbore operations. As used herein, unless the context otherwise requires, the term "dry flowable materials" includes and may refer to any type of dry material, including but not limited to dry additives, particulates, powders, granules, bulk solids, grains, and the like. For example, in some embodiments, the disclosed systems and methods may be utilized to dispense dry flowable materials for fracture treatments performed on a hydrocarbon recovery well. In other embodiments, the disclosed systems and methods may be utilized to dispense any number of dry flowable materials (e.g., proppant, diverters, sand, gel, powders, granules, etc.) for diversions, conductor-frac applications, cement mixing, drilling mud mixing, and other fluid mixing applications. However, it should be noted that the systems and methods of the present disclosure may be used in other contexts as well. For example, the vacuum dispensing systems may be used in agricultural applications to dispense grain, feed, seed, or mixtures of the same. Numerous other applications may be realized for handling and dispensing various dry flowable materials in a metered fashion to a desired location under vacuum conditions in accordance with the methods and systems of the present disclosure.

In certain embodiments, the systems and methods of the present disclosure may utilize any source of vacuum that can create a vacuum pressure in a sufficient amount so that the disclosed systems and methods may achieve a desired function and/or a desired purpose. For example, in some embodiments, the vacuum source may create a vacuum pressure or force sufficient to direct the dry flowable materials from a vessel to a common vacuum manifold. In other embodiments, the vacuum source may create a vacuum pressure or force sufficient to direct the dry flowable materials from a vessel to a surge bin connected at a discharge end of a common vacuum manifold. Accordingly, the surge bin may serve as the receiving point where the dry flowable materials are discharged. In such embodiments, the surge bin connected at the discharge end of the common vacuum manifold is negatively pressurized by a vacuum source in communication with the interior of the surge bin, which may include any known industrial vacuum source or vacuum equipment suitable for collection of dry flowable materials. Examples of an industrial vacuum source or vacuum equipment that may be suitable in certain embodiments include any vacuum blower, vacuum compressor, vacuum pump, or other type of vacuum device that is configured to create a vacuum pressure. Moreover, the surge bin may be any tank or vessel of any suitable size, shape, and/or configuration.

As used herein, the terms "vacuum," "vacuuming," "vacuum pressure," and grammatical equivalents thereof refer to any pressure that is less than the local atmospheric pressure at the site. In some embodiments, there may be a desired vacuum pressure for dispensing the dry flowable materials. The desired vacuum pressure may refer to an optimal, favorable, or otherwise designated value or range of values of the vacuum pressure to be applied to a common vacuum manifold. In certain embodiments, the vacuum pressure applied to the common vacuum manifold may range in an amount of from about 6 inches Hg to about 21 inches Hg. In some embodiments, the vacuum pressure applied to the common vacuum manifold may range in an amount of from about 7 inches Hg to about 18 inches Hg. In other embodiments, the vacuum pressure applied to the common vacuum manifold may range in an amount of from about 8 inches Hg to about 14 inches Hg.

Turning now to the drawings, a system in accordance with the present disclosure will now be described. FIG. 1 is a schematic diagram of vacuum dispensing systems 100 in accordance with the present disclosure. The vacuum dispensing systems 100 include one or more vessels 110 that hold dry flowable materials. The one or more vessels 110 are separate from each other and independently transportable to, from, and/or about the site (e.g., for placement with or removal from the vacuum dispensing systems 100). In some embodiments, the one or more vessels 110 are placed upon a load cell base 120, which includes one or more load cells (not shown) for measuring the weight of the dry flowable materials held within each corresponding vessel 110. The one or more vessels 110 may each include an outlet 130 that is connected to and extending downward from the one or more vessels 110 to route the dry flowable materials from the one or more vessels 110 to a common vacuum manifold 140. In some embodiments, the vacuum dispensing systems 100 further include a source of vacuum 142 that is connected to the common vacuum manifold 140, which directs the dry flowable materials from the one or more vessels 110 to the common vacuum manifold 140.

In some embodiments, this transfer of dry flowable materials from the one or more vessels 110 to the common vacuum manifold 140 could be performed at a predetermined or metered flow rate. In some embodiments, each vessel 110 includes a discharge valve 145 that meters the amount of dry flowable materials being routed from the one or more vessels 110 to the common vacuum manifold 140. In some embodiments, the vacuum dispensing systems 100 may utilize a control system programmed to determine an amount of dry flowable materials contained within the one or more vessels 110 and being routed to the common vacuum manifold 140. For example, in some embodiments, the control system has a control box 160 for each vessel 110, in which the control box 160 may serve as an input and output station. In such embodiments, the control box 160 may transmit input signals to a centralized controller of the control system based on the weight of dry flowable materials in each vessel 110, as measured by the corresponding one or more load cells. At the same time, the control box 160 may transmit output signals to the corresponding discharge valves 145 based on the amount of dry flowable materials being routed to the common vacuum manifold 140, as determined by the control system.

In some embodiments, the dry flowable materials are routed to a discharge end 170 of the common vacuum manifold 140. In some embodiments, the vacuum dispensing systems 100 further include a flush valve 180 for expelling dry flowable materials from the common vacuum manifold 140. In such embodiments, the flush valve 180 is disposed on an end of the common vacuum manifold 140 opposite to the discharge end 170 of the common vacuum manifold 140 in order to expel dry flowable materials from the common vacuum manifold 140. Various arrangements of the components in the vacuum dispensing systems 100 may be used and controlled to provide the flow of various dry flowable materials to the common vacuum manifold 140. This allows the vacuum dispensing systems 100 to provide a desired amount of various dry flowable materials to a downstream location using the common vacuum manifold 140.

In some embodiments, the one or more vessels 110 may be made of any metal, plastic, or other material that allows the one or more vessels 110 to hold the dry flowable materials. In some embodiments, the one or more vessels 110 may be equipped with one or more agitation devices 190 such as any vibrator, aerator, or other type of agitation device that is configured to mix and/or agitate the dry flowable materials within each vessel 110. The one or more vessels 110 may be completely separable and transportable from the vacuum dispensing systems 100, such that any vessel 110 may be selectively removed from the vacuum dispensing systems 100 and replaced with another vessel 110. That way, once the amount of additives in a vessel 110 runs low or empties, a new vessel 110 may be placed in the vacuum dispensing systems 100 to continue a batch transfer of dry flowable materials to the common vacuum manifold 140. In some instances, a vessel 110 may be removed from the vacuum dispensing systems 100 and replaced by another vessel 110 holding the same type or a different type of dry flowable materials to be provided to the common vacuum manifold 140. The exact number of vessels 110 that the vacuum dispensing systems 100 may include depends on a combination of factors such as, for example, the volume and width of the vessel 110, the demands of the operation, and/or the amount of space available to house the vacuum dispensing systems 100 (e.g., a warehouse building, a mobile trailer unit). In certain embodiments, the vacuum dispensing systems 100 may include one or more vessels 110 in an amount sufficient to improve the process efficiency of dispensing dry flowable materials. In certain embodiments, the vacuum dispensing systems 100 may include up to 30 vessels 110; however, in certain circumstances, more vessels 110 may be desired and will be entirely suitable for practice of the present disclosure. In such embodiments, the number of vessels 110 may range up to any one of: 31, 32, 33, 34, 35, 36, 37, 38, 39 vessels 110, and so on up to 99 vessels 110 in increments of 1 vessel 110. In some embodiments, the vacuum dispensing systems 100 may include vessels 110 in a number of from about 1 to about 30. In some embodiments, the vacuum dispensing systems 100 may include vessels 110 in a number of from about 11 to about 30. In other embodiments, the vacuum dispensing systems 100 may include vessels 110 in a number of about 21 to about 30.

In some embodiments, after one or more vessels 110 are emptied, the one or more vessels 110 may be refilled with designated dry flowable materials, for example, from bags. In other embodiments, the one or more vessels 110 may be removed from the vacuum dispensing systems 100 using a hoisting mechanism, such as any forklift, crane, or other type of hoisting device that may handle a vessel 110. In some embodiments, the one or more vessels 110 may be positioned on a skid, a pallet, or some other holding area until it can be removed from the site and/or refilled. In other embodiments, the one or more vessels 110 may be positioned directly onto a transportation unit for transporting one or more vessels 110 that are empty away from the site. In such embodiments, it should be noted that the same transportation unit used to provide the one or more vessels 110 to the desired location may then be utilized to remove the one or more vessels 110 from the site.

In some embodiments, an outlet 130 is disposed on and extending downward from each vessel 110 to route the dry flowable materials from one or more vessels 110 to a common vacuum manifold 140. The outlet 130 connects to a conduit 135 that connects its corresponding vessel 110 to the common vacuum manifold 140. The conduit 135 may be a pipe or hose through which the dry flowable materials may flow from one or more vessels 110 to the common vacuum manifold 140. In some embodiments, the conduit 135 may include an air intake valve 150 for expelling dry flowable materials from the conduit 135. In some embodiments, the conduit 135 may include a safety valve 155 for resolving an abnormal condition, such as preventing an uncontrollable flow of dry flowable materials to the common vacuum manifold 140. In some embodiments, the conduit 135 or the outlet 130 may include a shut-off valve (not shown) for resolving an abnormal condition and/or preventing the flow of dry flowable materials to the common vacuum manifold 140. For example, in some embodiments, the shut-off valve may prevent an uncontrollable flow of dry flowable materials to the common vacuum manifold 140 after a power failure. In such embodiments, the shut-off valve may be closed until the vacuum dispensing systems 100 have returned to normal operation.

In some embodiments, any suitable valves, pumps, vacuum blowers, or other devices may be used for controlling the flow of dry flowable materials through the conduit 135. In some embodiments, a discharge valve 145 may control the amount of dry flowable materials being routed from its corresponding vessel 110 to the common vacuum manifold 140. Each outlet 130 may include a discharge valve 145 for selectively dispensing or blocking a flow of dry flowable materials from its corresponding vessel 110. Any type of discharge valve 145 that can be actuated open and closed may be used. In some embodiments, the discharge valve 145 may be selectively actuated into an open position, thereby allowing the dry flowable materials to flow through the outlet 130 and into the common vacuum manifold 140. In other embodiments, when it is desired to stop the flow of dry flowable materials or once its corresponding vessel 110 is emptied, the discharge valve 145 may be actuated to a closed position, inter alia, to block the flow of dry flowable materials to the common vacuum manifold 140.

In some embodiments, the vacuum dispensing systems 100 may include one or more actuators (not shown) used to actuate the discharge valves 145. The one or more actuators may be communicatively coupled to the one or more vessels 110 and their corresponding discharge valves 145. Examples of one or more actuators that may be suitable in certain embodiments include rotary actuators, linear actuators, pneumatic actuators, or any other desired type of actuators for engaging and moving the discharge valves 145 between closed and open positions. The actuators may be automated and, in some instances, may allow for manual override of the automated system.

In some embodiments, a load cell base 120 is disposed beneath each vessel 110, in which the load cell base 120 includes one or more load cells so that the weight of the dry flowable materials in each vessel 110 may be directly and continuously measured. For example, in some embodiments, the load cell base 120 includes four load cells, in which each load cell is disposed in a corner of the load cell base 120, in order to appropriately weigh the dry flowable materials in each vessel 110. Examples of the one or more load cells include but are not limited to strain gauges, piezoelectric gauges, hydraulic gauges, pneumatic gauges, or similar devices. Each of the load cells is connected using a wired or wireless connection to a scale indicator (not shown), which communicates to a control box 160 a signal indicative of the weight of its corresponding vessel 110 and its contents as sensed by the one or more load cells. Accordingly, the control box 160 transmits the corresponding information to a centralized controller of the control system. With information indicative of the weight of the one or more vessels 110, the control system may use that information with an algorithm to determine the weight of dry flowable materials in the one or more vessels 110. Furthermore, by monitoring the change in the weight of the dry flowable materials being routed from the one or more vessels 110 into the common vacuum manifold 140 per unit of time, the flow rate of the dry flowable materials into the common vacuum manifold 140 may be determined.

Where there is no loss of the dry flowable materials being routed to the common vacuum manifold 140, given the closed nature of the vacuum dispensing systems 100, the flow rate determined using the above technique may result in a highly accurate determination of the amount of dry flowable materials being dispensed. This technique, in turn, may facilitate accurate accounting and/or accurate billing for the amount of dry flowable materials being dispensed. In certain embodiments, the difference between the actual and targeted dispensing of dry flowable materials is from about 0.1 lbs up to about 1.0 lbs. In some embodiments, the difference between the actual and targeted dispensing of dry flowable materials is from about 0.1 lbs up to about 0.5 lbs. In other embodiments, the difference between the actual and targeted dispensing of dry flowable materials is from about 0.1 lbs up to about 0.3 lbs.

In some embodiments, the vacuum dispensing systems 100 may utilize a control system for regulating the dispensing of dry flowable materials. For example, the control system may be used to collect, process, and display data regarding activities at the site (either automatically using sensors at the site or manually entered into the system), perform calculations using that data, as described above, and/or execute instructions to perform various functions at a site. The control system may include an information handling system, such as a programmable logic controller (PLC), a suitably programmed computer, etc. Any suitable processing application software package may be used by the control system to process the data in keeping with the principles of this disclosure.

In some embodiments, the control system may include one or more control boxes 160, in which the one or more control boxes 160 may serve as an input and output station. The one or more control boxes 160 are coupled to one or more on-site resources (e.g., actuators) and may be configured to interpret commands to manipulate said on-site resources. For example, commands may adjust on-site resource settings such as valve positions. In some embodiments, the one or more control boxes 160 may be configured to interpret commands to manipulate the discharge valve 145 corresponding to each vessel 110. In some embodiments, the control system may be configured to handle complex control algorithms. As previously indicated, the control system may employ an algorithm to determine the weight of dry flowable materials in each vessel 110. As such, the control system may be configured to handle algorithms for adjusting the opening and closing of each discharge valve 145, based on the amount of dry flowable materials being routed to the common vacuum manifold 140 as measured by the one or more load cells for each vessel 110.

The control system may be centralized or distributed and may include one or more computer systems. Each computer system may have at least a processor for executing instructions and a memory for storing instructions and other data related to the computer system and the dispensing operations. A computer system may be one of a variety of devices having a processor and memory, including: a personal computer (laptop or desktop), a server, a workstation, a microcontroller, a microcomputer, a PLC, an integrated circuit, a mobile device such as a smartphone or personal data assistant, or any similar system. Although many of these devices combine a processor and a memory in a single assembly, the processor and memory may be distributed among several devices capable of communicating with each other.

The memory for storing instructions may be in any format or combination of memory formats known in the art and accessible, directly or indirectly, by the processor. The memory may be in the form of installation memory, such as an installation CD/DVD-ROM or USB "thumb" drive, system memory (i.e., RAM), or other forms of computer storage including mechanical hard drives, solid-state hard drives, optical discs, tape drives, flash memory, or secure digital cards. Depending on the type of memory used, the memory may be configured in a redundant array of independent disks or similar arrangement that provides redundancy or improved performance. Instructions executed by the processor may be stored in the memory as software, firmware, or any other format suitable for execution by the processor. The programs stored in memory may be created using any programming techniques and in any programming language. In one embodiment, the control system may perform one or more of a variety of functions including controlling dispensing equipment, collecting data from sensors, retrieving data from logs or look-up tables, performing calculations on the collected or retrieved data for analysis, monitoring the dispensing operations, communicating data to other computers or control systems using a local network or the internet, and storing data in a database or other similar form of collected data.

An operator may access the control system through a graphical user interface (GUI) as presented to the operator on a display. The operator may start, stop, resume, and/or cancel the dispensing operations by using the GUI. In one embodiment, the GUI may dynamically display data in real-time. The GUI may also display historical data, enabling an operator to review data collected earlier or during the dispensing operations. The GUI may display graphs, charts, or other forms of data that may be manipulated or customized by a user or system administrator to emphasize particular data of interest. For example, in some embodiments, the GUI may display valve opening percentages, unit status, unit numbers, materials numbers, material descriptions, lot numbers, load cell readings, target dispensing weights, and actual dispensing weights. In some embodiments, the user may add trend lines, change colors, or limit the data to a specific period of the dispensing operations.

The control system may be configured to issue alarms to personnel and equipment if the control system detects an abnormal condition. For example, the control system may issue an alarm if a sensor reading or a calculation result falls outside of a predetermined range of safe values. In response to the alarm, operators may manually modify dispensing operations to resolve the abnormal condition. Alternatively, the control system may automatically respond to the alarm by entering into an alternate mode of operation directed to resolving the abnormal condition. If the abnormal condition is not removed after a certain period of time, worsens, or is sufficiently outside of normal operating conditions, the control system may send an emergency shutdown signal stopping certain pieces of equipment or halting dispensing operations altogether.

Figure 2:
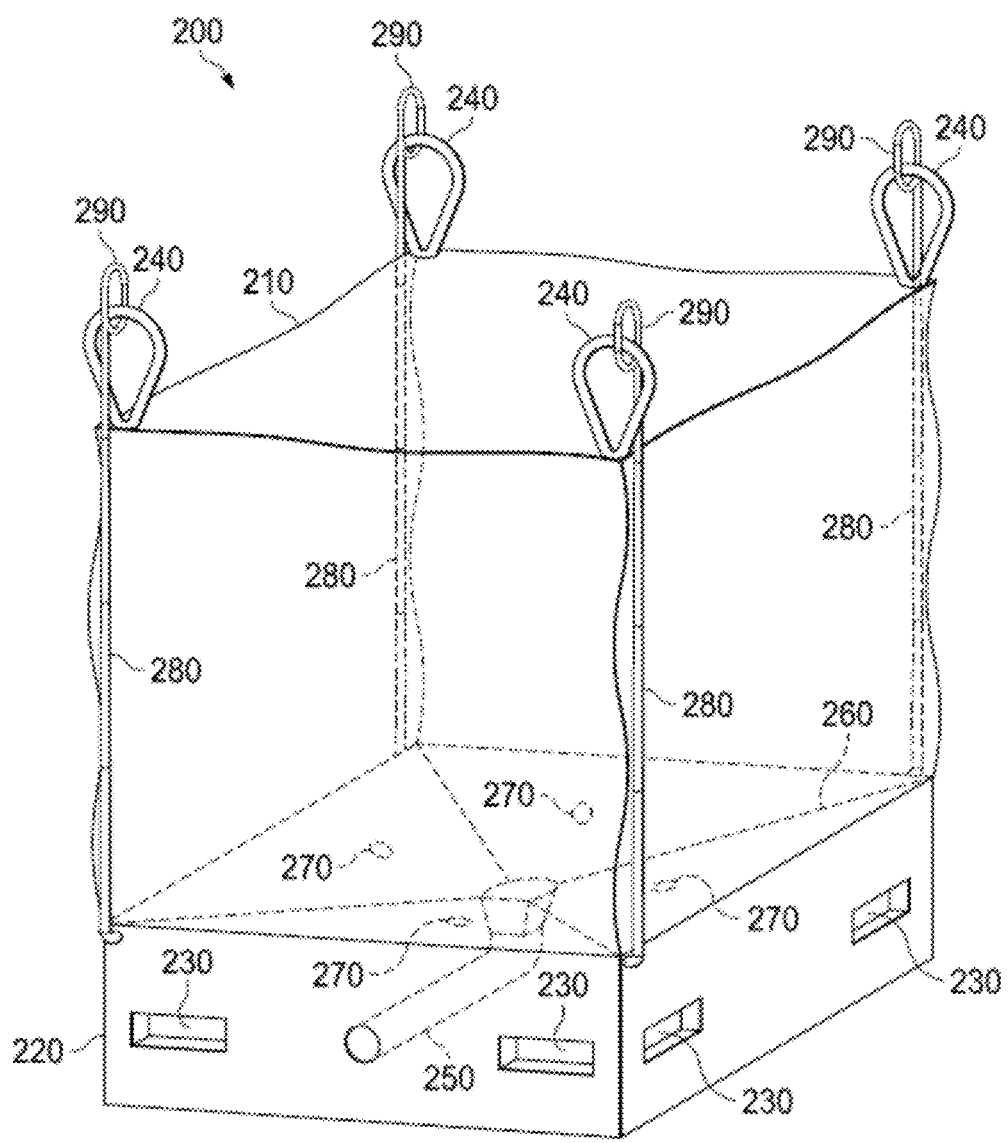
FIG. 2 is a perspective schematic view of a hybrid intermediate bulk container in accordance with certain embodiments of the present disclosure.

In some embodiments, the one or more vessels of the present disclosure may be a hybrid intermediate bulk container for handling dry flowable materials. For example, in reference to FIG. 2, a hybrid intermediate bulk container 200 is shown illustrating an example of one type of vessel for handling dry flowable materials in accordance with certain embodiments of the present disclosure. The hybrid intermediate bulk container 200 includes a bag portion 210 (e.g., similar to a typical "super sack") and a solid bottom structure 220 attached to the bottom of a bag portion 210. In some embodiments, the solid bottom structure 220 may be made of any metal, plastic, or other material that allows the hybrid intermediate bulk container 200 to handle and dispense the dry flowable materials. As such, the hybrid intermediate bulk container 200 may simplify the process of refilling dry flowable materials in vessels by providing a container that readily connects to vacuum dispensing systems of the present disclosure.

In some embodiments, a hoisting mechanism (e.g., forklift, crane, etc.) may be used to remove the hybrid intermediate bulk container 200 from a transportation system unit and to place the hybrid intermediate bulk container 200 into a desired or predetermined position. To that end, the hybrid intermediate bulk container 200 may include forklift pockets 230 that a forklift can engage to lift and manipulate the hybrid intermediate bulk container 200 about a site. In the illustrated embodiment, the forklift pockets 230 are formed in a section of the solid bottom structure 220 that is slightly elevated above a lower edge of the hybrid intermediate bulk container 200. This may enable relatively easy release of the forklift from the hybrid intermediate bulk container 200 once the hybrid intermediate bulk container 200 is positioned on the ground or predetermined location. The forklift pockets 230 may be formed through a central portion of the solid bottom structure 220 to keep the weight of the hybrid intermediate bulk container 200 evenly distributed during movement at the site or predetermined location.

In some embodiments, the hybrid intermediate bulk container 200 may include other types of mechanical features for interfacing with another type of hoisting mechanism. For instance, the hybrid intermediate bulk container 200 may include one or more lifting eyes 240 for interfacing with a crane or forklift used to position the hybrid intermediate bulk container 200 as needed at the site or predetermined location. As shown, the lifting eyes 240 may be disposed at the upper corners of the typical "super sack" bag portion 210 to keep the weight of the hybrid intermediate bulk container 200 evenly distributed during movement at the site or predetermined location. In some embodiments, the one or more lifting eyes 240 may be used to increase the structural integrity of the hybrid intermediate bulk container 200. For example, the hybrid intermediate bulk container 200 may include one or more telescoping rods 280 disposed along the corners of the bag portion 210 that connect to the one or more lifting eyes 240. In some embodiments, the one or more telescoping rods 280 may be locked in a straight-upright position to facilitate holding up the hybrid intermediate bulk container 200. In some embodiments, the one or more telescoping rods 280 may be stowed away along the corners of the solid bottom structure 220. The one or more telescoping rods 280 may connect to the one or more lifting eyes 240 using a coupling device 290. The coupling device 290 is disposed on the end of each telescoping rod 280 proximate to the one or more lifting eyes 240. Examples of the coupling device 290 that may be suitable in certain embodiments include any carabiner, shackle, clevis, or other connecting device for coupling the one or more telescoping rods 280 to the one or more lifting eyes 240.

In some embodiments, the hybrid intermediate bulk container 200 may include an outlet 250 that is connected to and extending downward from the solid bottom structure 220 to route the dry flowable materials from the solid bottom structure 220 to a common vacuum manifold. For facilitating the dispensing of dry flowable materials, the solid bottom structure 220 may have a shape and size that is suitable for the particular application. As illustrated, in certain embodiments, the solid bottom structure 220 may include an interior sloped section 260 that slants toward the outlet 250. In such embodiments, the solid bottom structure 220 may include any cone bottom, curved bottom, and other shapes that allow for adequate draining from the hybrid intermediate bulk container 200. Moreover, the solid bottom structure 220 may be equipped with one or more agitation devices 270 such as any vibrator, aerator, or other type of agitation device that is configured to mix and/or agitate the dry flowable materials within each hybrid intermediate bulk container 200.

Figure 3:
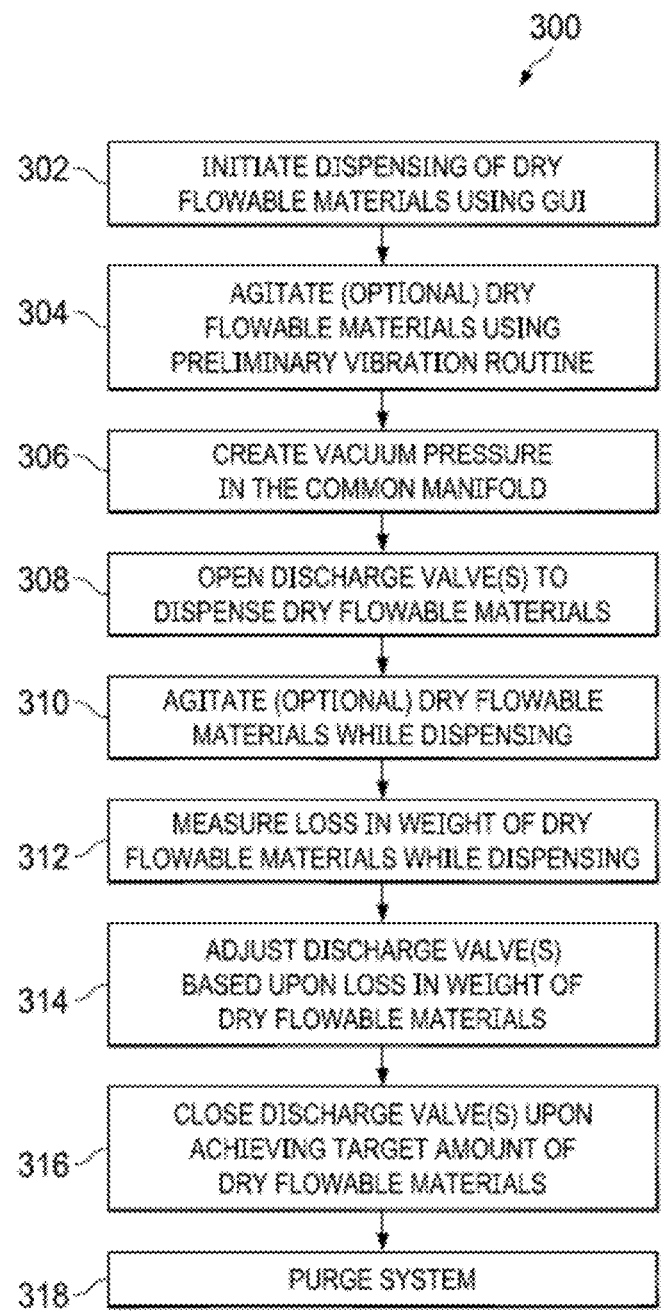
FIG. 3 is a flow chart depicting the process of dispensing dry flowable materials in accordance with certain embodiments of the present disclosure.
Figure 4:
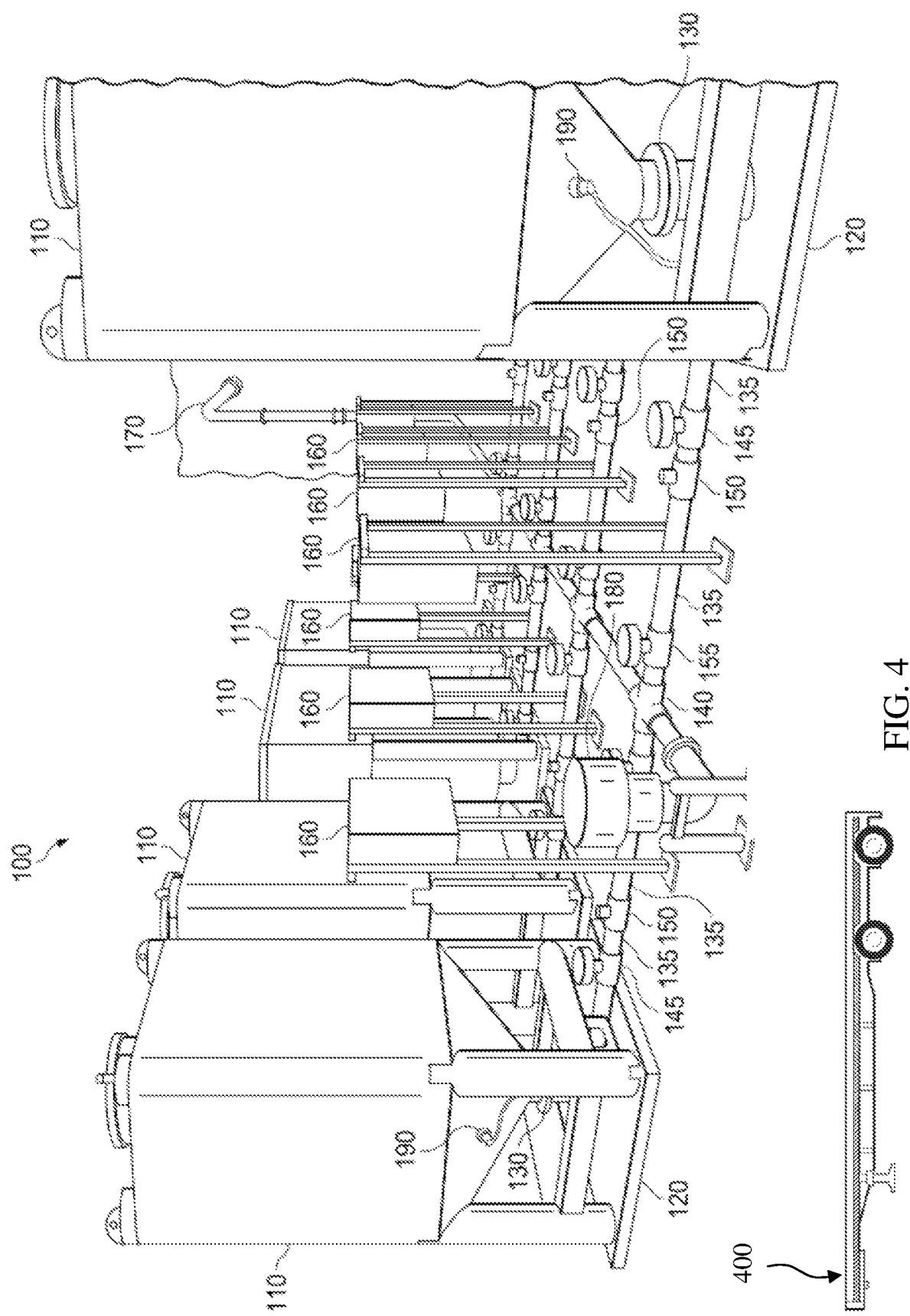
FIG. 4 is one embodiment of a vacuum dispensing system 100 designed, manufactured and/or operated according to one or more embodiments of the disclosure, as might be integrated into a mobile trailer unit 400.

The present disclosure in some embodiments provides methods that include the use of vacuum dispensing systems to dispense dry flowable materials. For example, and with reference to FIG. 3, a flow chart 300 of a typical method for dispensing dry flowable materials in accordance with certain embodiments of the present disclosure is provided. The use of arrows in FIG. 3 is not meant to imply any particular order in which the methods of the present disclosure must be performed. It should be noted that while FIG. 3 generally depicts a methodology for dispensing dry flowable materials, those skilled in the art will readily recognize that the principles described herein may be equally applicable to dispensing processes for other materials.

The disclosed method in FIG. 3 is initiated when an operator operates an interface (e.g., GUI) coupled to a control system to start the dispensing process in vacuum dispensing systems at step 302. In some embodiments, the method of the present disclosure may include an option to begin the dispensing process with a preliminary vibration or agitation routine 304 in one or more vessels in order to loosen up the dry flowable materials. In such embodiments, the preliminary vibration or agitation routine 304 may require that a vibrating or aerating device be disposed on one or more vessels. Next, the disclosed method may use any source of vacuum to create a vacuum pressure in a common vacuum manifold at step 306. The dispensing of dry flowable materials may commence once the vacuum pressure exceeds a certain threshold (e.g., about 6 inches Hg to about 21 inches Hg).

For dispensing the dry flowable materials, the disclosed method may employ a control system to open a discharge valve on a corresponding vessel at step 308. Typically, the dry flowable materials may be dispensed from two or more vessels at the same time. Alternatively, in some embodiments, the dry flowable materials may be dispensed from only one vessel at a time, in the order of vessels with the largest amount to the smallest amount of dry flowable materials to be dispensed. The maximum number of vessels that may simultaneously dispense dry flowable materials can be preconfigured in the control system. In some embodiments, the dry flowable materials are agitated using a vibrating or aerating device while being discharged from one or more vessels at step 310. As the dry flowable materials are discharged from one or more vessels to the common vacuum manifold, the amount of dry flowable materials dispensed to the common vacuum manifold is measured by a loss in weight in the one or more vessels at step 312. This loss in weight, which corresponds to the amount of dry flowable materials dispensed to the common vacuum manifold, is determined by the control system in order to be used for controlling the dispensing process.

The control system is in communication with the one or more load cells and the one or more discharge valves that each correspond to a distinct vessel. Based upon the measured amount of dry flowable materials being dispensed to the common vacuum manifold, the control system is programmed to adjust the discharge valves in order to meter the flow of dry flowable materials at step 314. Specifically, the control system is configured to adjust an actuator to partially or completely open or close the discharge valves based on the amount of dry flowable materials being routed to the common vacuum manifold, as measured by the one or more load cells. In some embodiments, the one or more discharge valves may repeatedly dribble open and closed in order to control the amount of dry flowable materials being dispensed to the common vacuum manifold. In other embodiments, the one or more discharge valves may open to a certain opening percentage in order to control the amount of dry flowable materials being dispensed to the common vacuum manifold.

Once the dispensed amount of dry flowable materials is within a specified threshold of the targeted amount, the control system will close the one or more discharge valves at step 316. After the dispensing of dry flowable materials is completed, the vacuum dispensing systems may then be purged of any remaining dry flowable materials at step 318. The purge may be performed using a flush valve disposed on the common vacuum manifold to expel any leftover dry flowable materials in the common vacuum manifold. For example, in some embodiments, the flush valve is disposed on an end of the common vacuum manifold opposite to a discharge end of the common vacuum manifold in order to expel dry flowable materials from the common vacuum manifold. The purge may be initiated using the control system or manually operated by an operator. The steps depicted in FIG. 3 may be applied to any number of dry flowable materials. As such, switching from one type of dry flowable material to another type of dry flowable material may be performed without any preparations since the disclosed vacuum dispensing systems have different types of dry flowable materials that are ready to dispense at any given time.

To further improve the mobility, transportability, and rig-up speed at the job site, the systems and methods of the present disclosure may be transportable to and from a desired or predetermined location on a flatbed trailer or some other transportation unit. Alternatively, in some embodiments, the disclosed systems and methods may be integrated into a flatbed trailer so that the resultant vacuum dispensing trailer unit is its own transportation unit. In such embodiments, the vacuum dispensing trailer unit may include similar components as previously described for the vacuum dispensing systems of the present disclosure. In addition, the vacuum dispensing trailer unit may include wheels for enabling transportation of the vacuum dispensing trailer unit to and from a desired or predetermined location (e.g., well site). In some embodiments, a front end of the vacuum dispensing trailer unit may be designed to lift up and hook onto a trailer hitch of a transportation vehicle. Once the vacuum dispensing trailer unit is transported to the site, the front end may be lifted off the transportation vehicle and the vacuum dispensing trailer unit may be lowered directly to the ground, without the use of a hoisting mechanism. The vacuum dispensing systems may be integrated into other types of mobile trailer units as well.

Having the vacuum dispensing systems integrated into a separate mobile unit may improve the reliability of the various components that make up the vacuum dispensing systems and thus may increase the life of the vacuum dispensing systems. For example, every time one or more vessels is lifted or moved using a hoisting mechanism, then any of the various components that make up the vacuum dispensing systems may be negatively impacted. Shock from movement of the relatively large vessels about a site may lead to undesirable operations of the components in the vacuum dispensing systems. With the vacuum dispensing systems integrated into a separate trailer unit, the shock due to the loading and unloading of the vessels itself is minimized. Furthermore, in some embodiments, the vacuum dispensing trailer unit also may include an air suspension system or other components to reduce shock on the vacuum dispensing systems during transportation. The suspension system may help to further isolate the electronics and controls of the vacuum dispensing systems from shock loading during transportation of the vacuum dispensing trailer unit along a road.

An embodiment of the present disclosure is a vacuum dispensing system including: at least one vessel for holding dry flowable materials; a load cell base disposed underneath each of the vessels, wherein the load cell base includes at least one load cell that is configured to measure load in the vessel reflective of a weight of the dry flowable materials contained within the vessel; an outlet disposed at a bottom surface of each of the vessels; a common vacuum manifold connected to the outlets of each of the vessels for routing the dry flowable materials from the vessel to the common vacuum manifold; a discharge valve disposed on the outlet of each of the vessels; a controller in communication with each of the discharge valves and the load cells programmed to determine an amount of dry flowable materials contained within the vessel and being routed to the common vacuum manifold; and a vacuum source for directing a flow of the dry flowable materials from the vessels to the common vacuum manifold.

In one or more embodiments described in the preceding paragraph, the vacuum dispensing system further includes an actuator coupled to the discharge valve and the controller. In one or more embodiments described in the preceding paragraph, the controller is programmed to adjust the actuator to at least partially open or close the discharge valve based on the amount of dry flowable materials being routed to the common vacuum manifold as measured by the at least one load cell. In one or more embodiments described in the preceding paragraph, the vacuum dispensing system further includes a surge bin connected at a discharge end of the common vacuum manifold. In one or more embodiments described in the preceding paragraph, the vacuum dispensing system further includes a flush valve disposed on an end of the common vacuum manifold opposite a discharge end of the common vacuum manifold to expel dry flowable materials from the common vacuum manifold. In one or more embodiments described in the preceding paragraph, the common vacuum manifold is configured to maintain a vacuum pressure of from about 6 inches Hg to about 21 inches Hg. In one or more embodiments described in the preceding paragraph, the vacuum dispensing system is integrated into a mobile trailer unit. In one or more embodiments described in the preceding paragraph, the vacuum dispensing system includes between 1 and 30 vessels. In one or more embodiments described in the preceding paragraph, the vessel includes forklift pockets. In one or more embodiments described in the preceding paragraph, the vessel further includes a vibrating or aerating device. In one or more embodiments described in the preceding paragraph, the vacuum source is a vacuum blower, a vacuum compressor, or a vacuum pump.

An embodiment of the present disclosure is a method that includes: providing at least one vessel that contains dry flowable materials, each vessel including an outlet connected to a common vacuum manifold; providing a vacuum source for directing a flow of the dry flowable materials from the at least one vessel to the common vacuum manifold; discharging the dry flowable materials from the at least one vessel to the common vacuum manifold through an outlet connected to the at least one vessel, wherein a discharge valve is disposed on the outlet; determining an amount of dry flowable materials in at least one vessel at least in part using at least one load cell disposed underneath the at least one vessel; and determining the amount of dry flowable materials being routed to the common vacuum manifold based at least in part on the amount of dry flowable materials measured in the at least one vessel.

In one or more embodiments described in the preceding paragraph, the method further includes metering the flow of the dry flowable materials from the at least one vessel to the common vacuum manifold using a controller. In one or more embodiments described in the preceding paragraph, the controller is programmed to adjust an actuator to at least partially open or close the discharge valve based on the amount of dry flowable materials being routed to the common vacuum manifold as measured by the at least one load cell. In one or more embodiments described in the preceding paragraph, the common vacuum manifold receives dry flowable materials from two or more vessels at the same time. In one or more embodiments described in the preceding paragraph, the vacuum source provides a vacuum pressure of from about 6 inches Hg to about 21 inches Hg. In one or more embodiments described in the preceding paragraph, the at least one vessel is a hybrid intermediate bulk container.

An embodiment of the present disclosure is a vacuum dispensing system including: at least one hybrid intermediate bulk container for holding dry flowable materials; a load cell base disposed underneath each of the hybrid intermediate bulk containers, wherein the load cell base includes at least one load cell that is configured to measure load in the hybrid intermediate bulk container reflective of a weight of the dry flowable materials contained within the hybrid intermediate bulk container; an outlet disposed at a bottom surface of each of the hybrid intermediate bulk containers; a common vacuum manifold connected to the outlets of each of the hybrid intermediate bulk containers for routing the dry flowable materials from the hybrid intermediate bulk container to the common vacuum manifold; a discharge valve disposed on the outlet of each of the hybrid intermediate bulk containers; and a controller in communication with each of the discharge valves and the load cells programmed to determine an amount of dry flowable materials contained within the hybrid intermediate bulk container and being routed to the common vacuum manifold.

In one or more embodiments described in the preceding paragraph, the vacuum dispensing system further includes a vacuum source for directing a flow of the dry flowable materials from the hybrid intermediate bulk containers to the common vacuum manifold. In one or more embodiments described in the preceding paragraph, the hybrid intermediate bulk container includes a solid bottom structure with an interior sloped section that slants toward the outlet.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A vacuum dispensing system comprising:
   at least two vessels for holding dry flowable materials;
   a load cell base disposed underneath each of the vessels, wherein the load cell base comprises at least one load cell that is configured to measure load in the vessel reflective of a weight of the dry flowable materials contained within the vessel;

an outlet disposed at a bottom surface of each of the vessels;
a common vacuum manifold connected to the outlets of each of the vessels for routing the dry flowable materials from the vessels to the common vacuum manifold;
a discharge valve disposed on the outlet of each of the vessels;
ones of air intake valves disposed in the common vacuum manifold proximate ones of the at least two vessels:
a controller in communication with each of the discharge valves and the at least one load cell programmed to determine an amount of dry flowable materials contained within the vessel and being routed to the common vacuum manifold; and
a vacuum source for directing a flow of the dry flowable materials from the vessels to the common vacuum manifold.

2. The vacuum dispensing system of claim 1, further comprising an actuator coupled to the discharge valve and the controller.

3. The vacuum dispensing system of claim 2, wherein the controller is programmed to adjust the actuator to at least partially open or close the discharge valve based on the amount of dry flowable materials being routed to the common vacuum manifold as measured by the at least one load cell.

4. The vacuum dispensing system of claim 1, further comprising a surge bin connected at a discharge end of the common vacuum manifold.

5. The vacuum dispensing system of claim 1, further comprising a flush valve disposed on an end of the common vacuum manifold opposite a discharge end of the common vacuum manifold to expel dry flowable materials from the common vacuum manifold.

6. The vacuum dispensing system of claim 1, wherein the vacuum source is configured to continuously maintain a vacuum pressure of from about 6 inches Hg to about 21 inches Hg on the common vacuum manifold.

7. The vacuum dispensing system of claim 1, wherein the vacuum dispensing system is integrated into a mobile trailer unit.

8. The vacuum dispensing system of claim 1, wherein the vacuum dispensing system comprises up to 30 vessels.

9. The vacuum dispensing system of claim 1, wherein the vessel comprises forklift pockets.

10. The vacuum dispensing system of claim 1, wherein the vessel further comprises an aerating device.

11. The vacuum dispensing system of claim 1, wherein the vacuum source is a vacuum blower, a vacuum compressor, or a vacuum pump.

12. A method comprising:
providing at least two vessels that contain dry flowable materials, each vessel comprising an outlet connected to a common vacuum manifold;
providing a vacuum source for directing a flow of the dry flowable materials from the at least two vessels to the common vacuum manifold;
providing ones of air intake valves in the common vacuum manifold proximate ones of the at least two vessels:
discharging the dry flowable materials from the at least two vessels to the common vacuum manifold through an outlet connected to the at least two vessels, wherein a discharge valve is disposed on the outlet;
determining an amount of dry flowable materials in the two vessels at least in part using ones of load cells disposed underneath the at least two vessels; and
determining the amount of dry flowable materials being routed to the common vacuum manifold based at least in part on the amount of dry flowable materials measured in the at least two vessels.

13. The method of claim 12, further comprising metering the flow of the dry flowable materials from the at least two vessels to the common vacuum manifold using a controller.

14. The method of claim 13, wherein the controller is programmed to adjust an actuator to at least partially open or close the discharge valve based on the amount of dry flowable materials being routed to the common vacuum manifold as measured by the ones of load cells.

15. The method of claim 12, wherein the common vacuum manifold receives dry flowable materials from the at least two vessels at the same time.

16. The method of claim 12, wherein the vacuum source continuously maintains a vacuum pressure of from about 6 inches Hg to about 21 inches Hg on the common vacuum manifold.

17. The method of claim 12, wherein the at least two vessels are hybrid bulk containers.

18. A vacuum dispensing system comprising:
at least two hybrid bulk containers for holding dry flowable materials;
a load cell base disposed underneath each of the hybrid bulk containers, wherein the load cell base comprises at least one load cell that is configured to measure load in the hybrid bulk container reflective of a weight of the dry flowable materials contained within the hybrid bulk container;
an outlet disposed at a bottom surface of each of the hybrid bulk containers;
a common vacuum manifold connected to the outlets of each of the hybrid bulk containers for routing the dry flowable materials from the hybrid bulk container to the common vacuum manifold;
a discharge valve disposed on the outlet of each of the hybrid bulk containers;
ones of air intake valves disposed in the common vacuum manifold proximate ones of the at least two vessels:
a controller in communication with each of the discharge valves and the load cells programmed to determine an amount of dry flowable materials contained within the hybrid bulk container and being routed to the common vacuum manifold; and
a vacuum source for directing a flow of the dry flowable materials from the at least two hybrid bulk containers to the common vacuum manifold.

19. The vacuum dispensing system of claim 18, wherein at least one of the hybrid bulk containers comprises a solid bottom structure with an interior sloped section that slants toward the outlet.

\* \* \* \* \*